United States Patent
Smith et al.

(10) Patent No.: US 6,281,795 B1
(45) Date of Patent: *Aug. 28, 2001

(54) RFID OR EAS LABEL MOUNT WITH DOUBLE SIDED TAPE

(75) Inventors: Fran Smith, North Tonawanda; Stan Serwon, Tonawanda; Jerome Cross, Buffalo; Dominick L. Monico, Williamsville, all of NY (US)

(73) Assignee: Moore North America, Inc., Grand Island, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,347

(22) Filed: Feb. 8, 2000

(51) Int. Cl.[7] ............................... G08B 13/14
(52) U.S. Cl. .................... 340/572.1; 340/572.3; 340/572.8; 156/249
(58) Field of Search ............... 340/572, 572.3, 340/572.8, 572.1; 235/385, 384, 381; 705/22, 23, 28; 156/249; 428/354, 40

(56) References Cited

U.S. PATENT DOCUMENTS

| | | | |
|---|---|---|---|
| 5,019,436 | * 5/1991 | Schramer et al. | 428/40 |
| 5,206,626 | 4/1993 | Minasy et al. | 340/572 |
| 5,331,313 | 7/1994 | Koning | 340/551 |
| 5,343,647 | * 9/1994 | Bulka | 40/630 |
| 5,353,011 | * 10/1994 | Wheeler et al. | 340/572 |
| 5,587,703 | * 12/1996 | Dumont | 340/572 |
| 5,628,858 | * 5/1997 | Petrou | 156/249 |
| 5,632,511 | * 5/1997 | Longtin et al. | 283/62 |
| 5,707,713 | 1/1998 | Langan et al. | 428/195 |
| 5,714,935 | * 2/1998 | Ryan, Jr. | 340/572 |
| 5,790,029 | * 8/1998 | Curnutte et al. | 340/572 |
| 5,844,485 | * 12/1998 | Ryan, Jr. | 340/572 |
| 5,867,102 | * 2/1999 | Souder et al. | 340/572 |
| 5,880,675 | 3/1999 | Trautner | 340/572 |
| 5,884,425 | 3/1999 | Baldwin | 40/638 |
| 5,982,284 | * 11/1999 | Baldwin et al. | 340/572.8 |
| 5,989,708 | * 11/1999 | Kreckel | 428/354 |
| 6,015,589 | * 1/2000 | Mehta et al. | 427/152 |
| 6,019,865 | * 2/2000 | Palmer et al. | 156/265 |
| 6,025,780 | * 2/2000 | Bowers et al. | 340/572.3 |

* cited by examiner

Primary Examiner—Benjamin C. Lee
Assistant Examiner—Phung Nguyen
(74) Attorney, Agent, or Firm—Nixon & Vanderhye P.C.

(57) ABSTRACT

A label having an EAS device or an RFID device associated therewith has a first face with human readable indicia on it and a second face with pressure sensitive repositional adhesive. The pressure sensitive repositional adhesive is pressed onto an exterior surface of a package which holds the label to the package. The package is then shipped to a destination indicated at least in part by the label, and at the destination the label is removed simply by detaching it by pulling it off, the repositional adhesive readily releasing from the package. The package then may be reused with a single label with either conventional construction or like the first label. Preferably the repositional adhesive is part of a piece of double sided adhesive tape, the second face either having permanent adhesive or repositional adhesive if the tape is to be removed from the body of the label and the RFID or EAS device of the label reused.

20 Claims, 3 Drawing Sheets

RFID OR EAS LABEL MOUNT WITH DOUBLE SIDED TAPE

BACKGROUND AND SUMMARY OF THE INVENTION

Some courier services, or other package delivery entities, are starting to use labels that have an RFID (radio frequency identification) device or EAS (electronic article surveillance) device incorporated in a label that also has human readable indicia. While these systems may be cost effective, they have a significant drawback associated with them. Most customers like to reuse a package that they receive, whether it be in the form of a carton, box, or even certain types of envelopes. However, in order to effectively reuse the package the original recipient of the package must obliterate the destination and like indicia that is associated with the label. Since the labels are typically applied with permanent adhesive, this is done by scratching off or covering up with ink or tape the human readable portions of the label. However, that obliteration has no effect on the RFID or EAS device information, which can result in wrong routing of the package when used the second time by the first recipient, or other disadvantages.

According to the present invention the method of utilizing a package, a package pursuant to the method, and a label for use in labeling a package and for practicing the method, are provided which overcome this drawback of the prior art. According to the present invention repositional adhesive is associated with the label having an RFID or EAS device, making the label easy to remove at the destination. Preferably this is accomplished by utilizing a double sided piece of tape having pressure sensitive adhesive on both sides thereof, one side the repositional adhesive that is pressed into contact with the package to be shipped, and the other a permanent or repositional adhesive depending upon whether or not it is desirable to attempt to reuse the original label with RFID or EAS device.

According to one aspect of the present invention a method of utilizing a package is provided comprising: (a) Applying to an exterior portion of the package a first label comprising an EAS device or an RFID device and having a first face with human readable indicia thereon and a second face with repositional pressure sensitive adhesive, the first label held to the package by the repositional adhesive. (b) Shipping the package to a destination indicated at least in part by the first label. (c) At the destination, removing the first label from the package by detaching the repositional adhesive from the package. And (d) reusing the package with a second, different, label.

In the method, (d) may be practiced utilizing as the second label one having an EAS or RFID device. According to one embodiment of the invention the repositional adhesive is part of a piece of double sided adhesive tape with repositional pressure sensitive adhesive on both faces of the tape, and the method further comprises (e) removing the double sided tape from the first label, and (f) reusing the first label with another piece of double sided tape. Also, (f) may be practiced after reprogramming the EAS or RFID device.

The first label may have a release liner covering the repositional adhesive, in which case (a) is practiced by removing the release liner and then pressing the repositional adhesive into contact with the package.

According to another aspect of the present invention a label, for use with a package, is provided comprising the following components: A label body having an EAS device or an RFID device associated therewith, the body having a first face with human readable indicia and a second face opposite the first face. A piece of double sided adhesive tape with a first pressure sensitive adhesive on a first face thereof and a second, repositional, pressure sensitive adhesive on a second face thereof. And the first pressure sensitive adhesive affixed to the label body second face.

In the label of the invention the first pressure sensitive adhesive may be permanent adhesive, or repositional adhesive. Also a release liner may cover the second pressure sensitive adhesive. In one embodiment the label body comprises a sealed element with an EAS device, and wherein the first adhesive adheres to the sealed element. In another embodiment the label body comprises an RFID device exposed on the second face thereof, and wherein the first adhesive substantially directly engages the RFID device. Typically, the second, repositional, adhesive engages and is adhered to a package, from which it is removable once the destination of the package is reached.

According to another aspect of the present invention a labeled package is provided comprising: A package having an exterior surface. A label having an EAS or RFID device associated therewith, a first face including human readable indicia, and a second face opposite the first face. And repositional adhesive adhering the second face of the label to the package exterior surface.

In the package described above the repositional adhesive is preferably on a first side of a piece of double sided tape, and has a second side with a second adhesive directly engaging the label second faces. The second adhesive may be permanent or repositional adhesive. The label may comprise a sealed element having an EAS device therein, or an exposed RFID device engages the double sided tape substantially directly.

It is a primary object of the present invention to provide an effective method of utilizing a package, a package so utilized, and a label facilitating effective utilization of the package. This and other objects of the invention will become clear from an inspection of the detailed of the invention and from the appended claims.

DETAILED DESCRIPTION OF THE DRAWINGS

Figure 1:
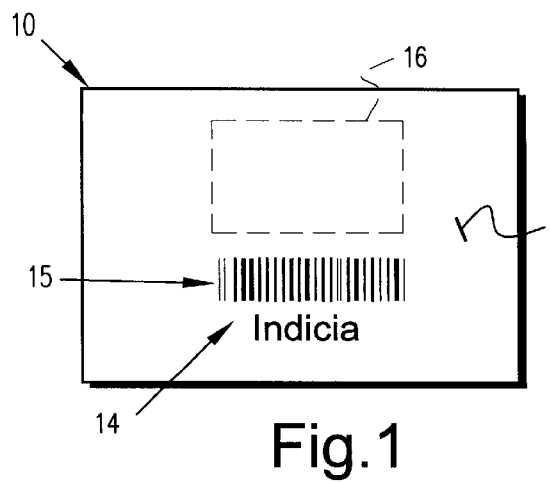
FIG. 1 is a front schematic view of an exemplary label body utilized in a label according to the present invention.
Figure 2:
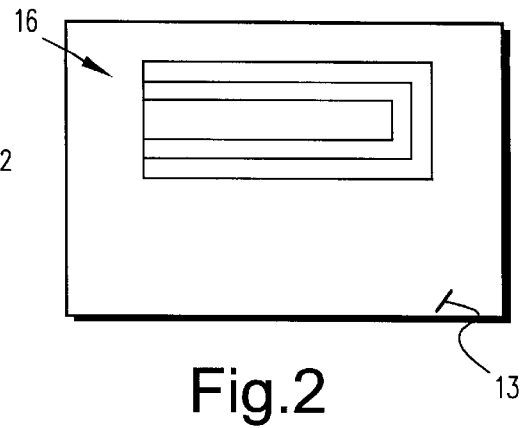
FIG. 2 is a rear schematic view of the label body of FIG. 1.

FIG. 1 is a front schematic plan view of an exemplary label body 10 utilizable in a label 11 (see FIG. 3) according to the present invention. The label 10 has a first face 12, which is the exterior face when the label is used, and a second face 13 (see FIG. 2) opposite the first face 12. On the first face 12 is imaged, in a conventional manner, human readable indicia illustrated schematically at 14 in FIG. 1. Also machine readable indicia, such as a bar code 15, may also be provided on the face 12. The label body 10 also has associated therewith an RFID device of conventional construction, such as shown in U.S. Pat. No. 5,497,140, the RFID device being shown in dotted line (because it is on the other side of the label 10) at 16 in FIG. 1, and in solid line at 16 in FIG. 2.

The label body 10 may be made of any suitable material such as paper, plastic, synthetic non-woven material such as TYVEK or TESLIN, polyester film, or the like. The RFID device 16 is printed on, embedded in, mounted on, or otherwise associated with the label body 10, being shown mounted on the second face 13 in FIG. 2. The label body 10 per se is conventional.

Figure 3:
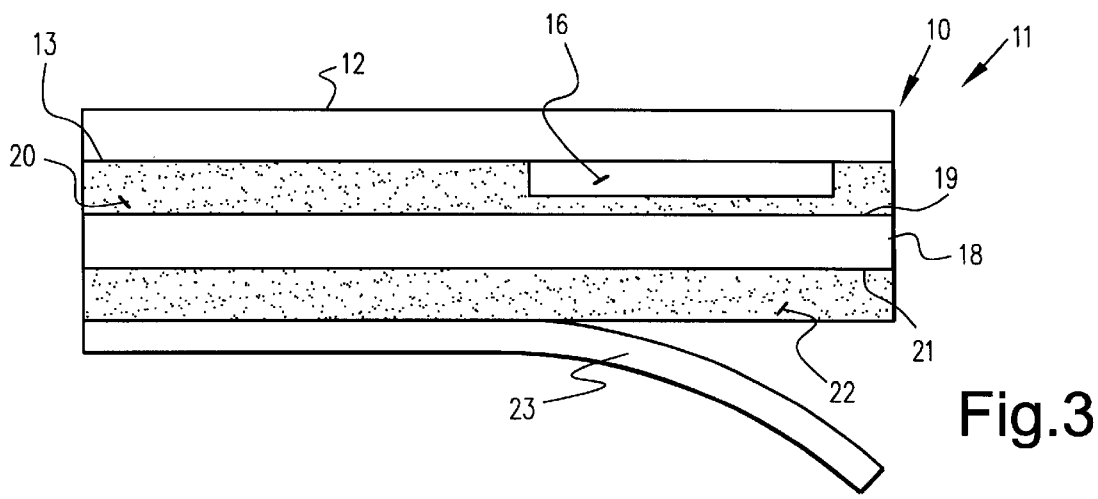
FIG. 3 is a side schematic view, with the thicknesses of the elements exaggerated for clarity of illustration, showing a label according to the present invention made from the label body of FIGS. 1 and 2.

An exemplary label 11 constructed from the label body 10 according to the invention is illustrated schematically in FIG. 3. According to the invention a piece of double sided tape 18, having a first face 19 with a first pressure sensitive adhesive 20, and a second face 21 with a second pressure sensitive adhesive 22, is utilized. Preferably the second adhesive 22 is covered by a conventional (e.g. silicone coated or highly calendered) release liner 23.

According to the present invention the second pressure sensitive adhesive 22 is repositional adhesive. Repositional adhesives hold securely to a surface when pressed into contact therewith, but are readily removable so as to leave almost no residue, and so that the integrity of the label body 10 is not compromised. While a wide variety of repositional adhesives may be utilized in the production of a label 11 according to the present invention, preferably the adhesive 22 comprises CLEANTAC® adhesive available from Moore North America, Lake Forest, Ill.

The first adhesive 20 may be conventional permanent pressure sensitive adhesive, or, under some circumstances, especially if the label body 10 and the RFID device 16 associated therewith is to be reused, may also be repositional adhesive, such as CLEANTAC® adhesive.

Figure 4:
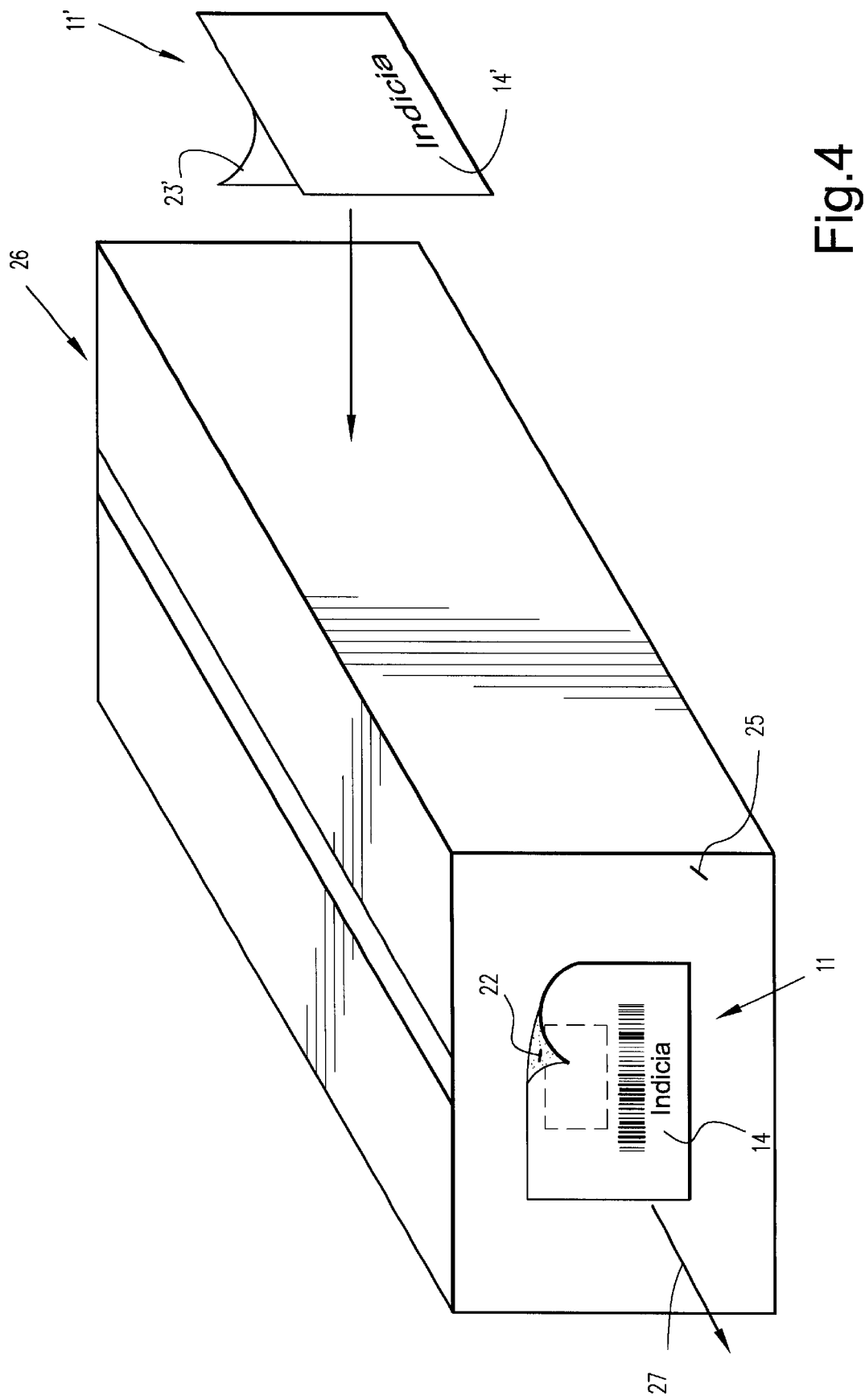
FIG. 4 shows one of the exemplary labels according to the present invention applied to a package, and being removed therefrom, and a second label having a release liner removed therefrom and then being applied to a package according to the invention.

FIG. 4 shows the label 11 applied to an exterior surface 25 of the conventional package 26, in this case a conventional cardboard carton. After the release liner 23 was removed, the repositional adhesive 22 was pressed into contact with the face 25 so that the label 11 remained in place with the indicia 14 readily readable from the exterior of the package 26. Once the package 26 has reached its destination and the recipient thereof desired to reuse the package 26, he or she merely pulls off the label 11, as indicated by the arrow 27 in FIG. 4, causing the repositional adhesive 22 to release from the surface 25. In this way the problems associated with attempted obliteration or inking or taping over of the indicia 14 are avoided.

FIG. 4 also schematically illustrates the utilization of a second label 11' according to the invention for the reuse of the carton 26. In this case, of course, the release liner 23' is removed and the repositional adhesive comparable to the adhesive 22 (not seen in FIG. 4) is pressed onto the same or a different exterior surface of the package 26 as the first label 11 so that the indicia 14' is readily visible. The label 11' need not be a label according to the present invention, but may be a conventional paper label having only human and machine readable indicia thereon, and no RFID or EAS device associated therewith.

Figure 5:
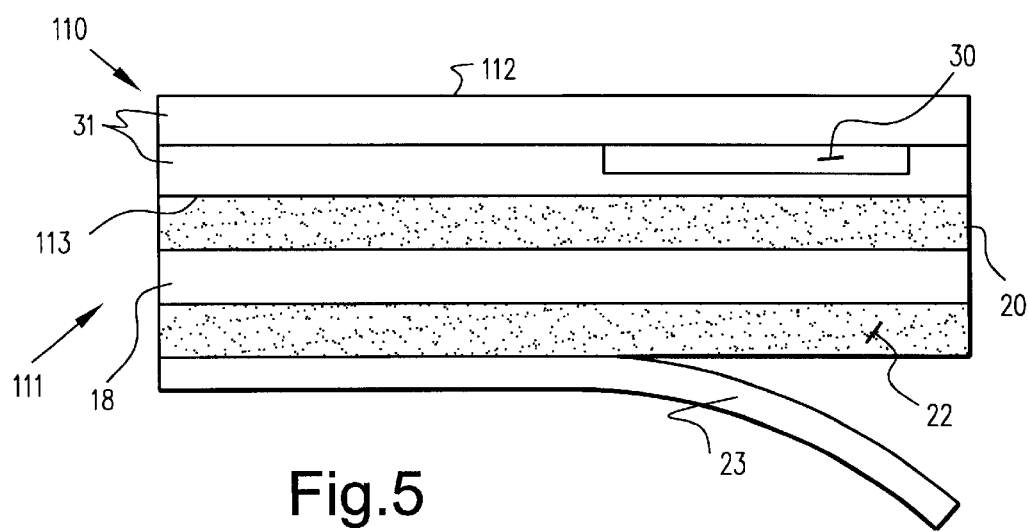
FIG. 5 is a view like that of FIG. 3 only showing a second version of label body according to the invention.

FIG. 5 is a view like that of FIG. 3 only it shows a label body 110 which has a conventional EAS device 30 (which has a conventional construction such as shown in U.S. Pat. Nos. 5,206,626 or 5,331,313) associated therewith. In this case the exterior face 112 of the label body 110, has indicia just like the indicia 14 illustrated in FIG. 1, and is part of a sealed element having the electronics of the EAS device 30 sealed therein. This is shown schematically in FIG. 5, for example, by two separate sheets or elements 31 with the electronics of the EAS 30 laminated therebetween to provide a sealed unit, the sealed unit comprising the body 110 with the second face 113 opposite the first face 112.

The label 111 includes the body 110 with exactly the same double sided tape illustrated in FIG. 3, that is with the first adhesive 20 of the tape 18 engaging the second face 113 of the body 110, and with the repositional, second, adhesive 22 covered by the release liner 23. The label 111 is used in the same manner as the labels 11,11' as schematically illustrated in FIG. 4.

Figure 6:
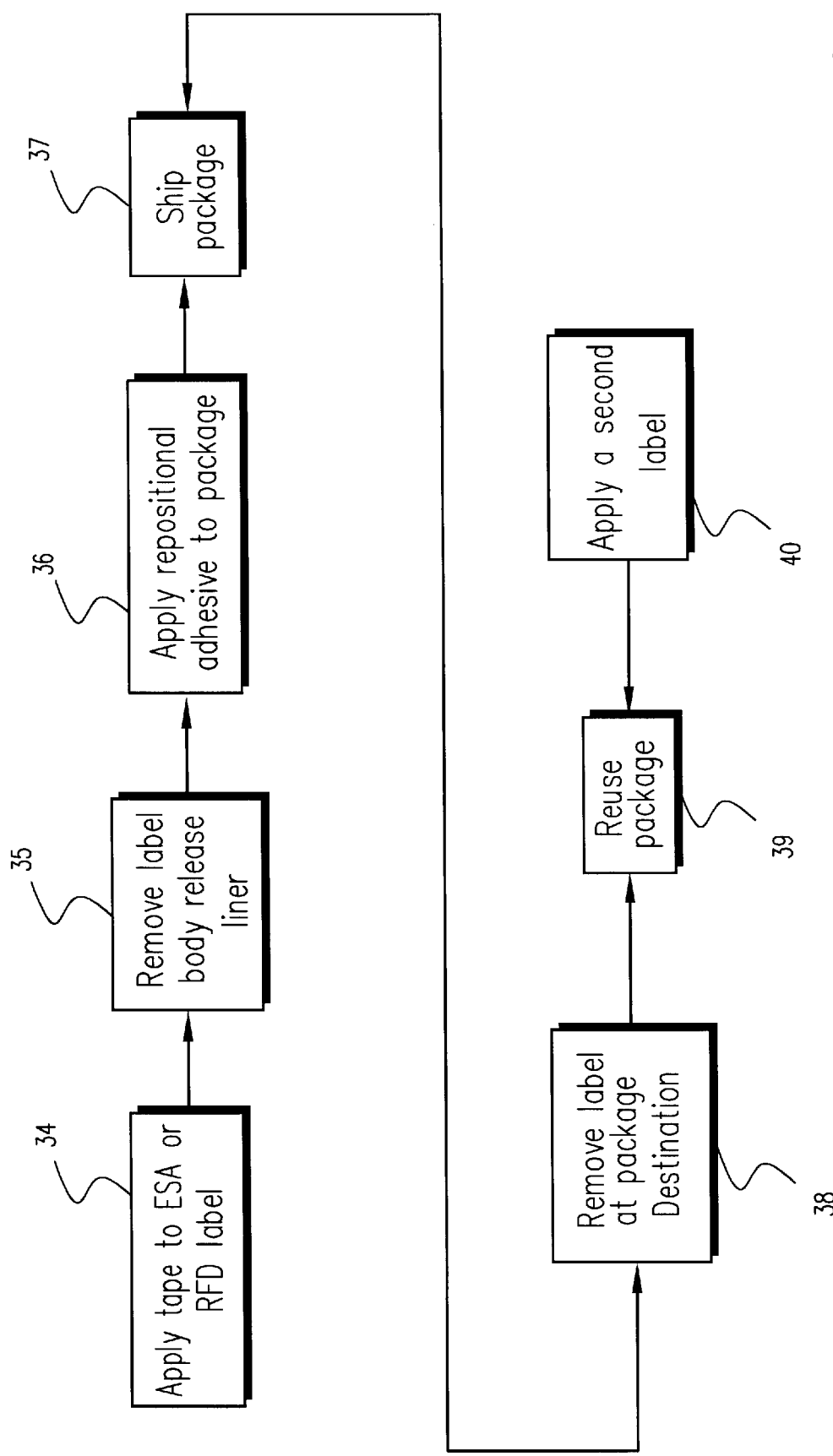
FIG. 6 is a schematic box diagram indicating various method procedures that may be followed in the practice of the method according to the present invention.

FIG. 6 schematically illustrates an exemplary method of utilizing a package (26) according to the invention. As indicated by box 34, a label 11,111 is constructed by applying tape 18 to an EAS associated label body 110 or an RFID associated label body 10. Then as indicated by box 35, the release liner 23 is removed typically manually, and as indicated by box 36 the repositional adhesive 22 is applied to the package 26 exterior face 25 as seen in FIG. 4. Then the package 26 is shipped, as indicated by box 37 in FIG. 6, to its ultimate destination. At its ultimate destination, or at a centralized facility, as indicated by box 38 in FIG. 6, the label 11, 111 is removed from the package 26 simply by detaching the readily releasing repositional adhesive 22 associated therewith, and then the package 26 is ready for reuse—as illustrated at 39 in FIG. 6. This reuse of the package 26 is typically accomplished by applying a second label, such as indicated at box 40 in FIG. 6, e.g. the label 11' of FIG. 4, or a conventional paper label, to the package 26. This procedure of applying new labels to the package 26 and removing the old labels may be repeated as desired until the package 26 is spent.

Where the first adhesive 20 is repositional adhesive, the tape 18 can be removed from the label body 10, 110 and the label body 10, 110 reused. This reuse may require reprogramming of the RFID device or the EAS device, utilizing conventional techniques.

It will thus be seen that according to the present invention a highly effective method of utilizing a package, in a manner that will substantially insure false redirection of the package once it is at a first destination and reused, as well as a labeled package produced and utilized in the practice of the method, and a label used to implement the method and to provide on the package, are provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of utilizing a package comprising:
   (a) applying to an exterior portion of the package a first label comprising an EAS device or an RFID device and having a first face with human readable indicia thereon and a second face with repositional pressure sensitive adhesive, the first label held to the package by the repositional adhesive;
   (b) shipping the package to a destination indicated at least in part by the first label;

(c) at the destination, removing the first label from the package by detaching the repositional adhesive from the package; and (d) reusing the package with a different label, wherein the repositional adhesive is part of a piece of double sided adhesive tape.

2. A method as recited in claim 1 wherein (d) is practiced using as the second label one having an EAS or RFID device.

3. A method as recited in claim 1 wherein the double sided adhesive tape has repositional pressure sensitive adhesive on both faces of the tape; and further comprising: (e) removing the double sided tape from the first label, and (f) reusing the first label with another piece of double sided tape.

4. A method as recited in claim 3 wherein (f) is practiced after reprogramming the EAS or RFID device.

5. A method as recited in claim 1 wherein the first label has a release liner covering the repositional adhesive, and wherein (a) is practiced by removing the release liner and then pressing the repositional adhesive into contact with the package.

6. A method as recited in claim 3 wherein (d) is practiced using as the second label one having an EAS or RFID device.

7. A label comprising:

a label body having an EAS device or an RFID device associated therewith, said body having a first face with human readable indicia and a second face opposite said first face;

a piece of double sided adhesive tape with a first pressure sensitive adhesive on a first face thereof and a second, repositional, pressure sensitive adhesive on a second face thereof; and said first pressure sensitive adhesive affixed to said label body second face, whereby said label body can be applied to a package and later removed from the package and the package reused.

8. A label as recited in claim 7 wherein said first pressure sensitive adhesive is permanent adhesive.

9. A label as recited in claim 7 wherein said first pressure sensitive adhesive is repositional adhesive.

10. A label as recited in claim 7 further comprising a release liner covering said second pressure sensitive adhesive.

11. A label as recited in claim 7 wherein said label body comprises a sealed element with an EAS device, and wherein said first adhesive adheres to said sealed element.

12. A label as recited in claim 7 wherein said label body comprises an RFID device exposed on said second face thereof, and wherein said first adhesive substantially directly engages said RFID device.

13. A label as recited in claim 7 wherein said second, repositional, adhesive engages and is adhered to a package.

14. A label as recited in claim 13 wherein said first pressure sensitive adhesive is permanent adhesive.

15. A label as recited in claim 13 wherein said first pressure sensitive adhesive is repositional adhesive.

16. A labeled package comprising:

a package having an exterior surface;

a label having an EAS or RFID device associated therewith, a first face including human readable indicia, and a second face opposite the first face; and repositional adhesive adhering said second face of said label to said package exterior surface, said repositional adhesive provided on a first side of a piece of double sided tape, and said tape having a second side with a second adhesive directly engaging said label second face, whereby said label can be selectively removed from said package exterior surface and the package reused.

17. A package as recited in claim 16 wherein said second adhesive is permanent pressure sensitive adhesive.

18. A package as recited in claim 16 wherein said second adhesive is repositional pressure sensitive adhesive.

19. A package as recited in claim 16 wherein said label comprises a sealed element having an EAS device therein.

20. A package as recited in claim 17 wherein said label comprises a sealed element having an EAS device therein.

* * * * *